June 9, 1931.  T. F. THOMPSON  1,809,647

TRANSMISSION

Filed Feb. 10, 1930

Inventor

Theodore F. Thompson

By M. Talbert Lock
Attorney

Patented June 9, 1931

1,809,647

UNITED STATES PATENT OFFICE

THEODORE F. THOMPSON, OF FORT DODGE, IOWA

TRANSMISSION

Application filed February 10, 1930. Serial No. 427,349.

The principal object of my invention is to provide a transmission that is capable of delivering desirous continuous uninterrupted power.

A still further object of this invention is to provide a transmission that is economical in manufacture and durable in use.

These and other objects will be apparent to those skilled in the art.

My invention consists in the construction, arrangement, and combination of the various parts of the device, whereby, the objects contemplated are attained as hereinafter more fully set forth, pointed out in my claims and illustrated in the accompanying drawings, in which:

Figure 1:
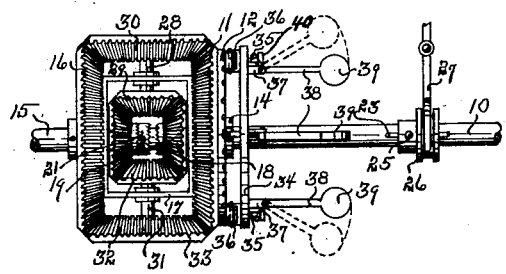
Fig. 1 is a top plan view of my complete invention ready for use.
Figure 2:
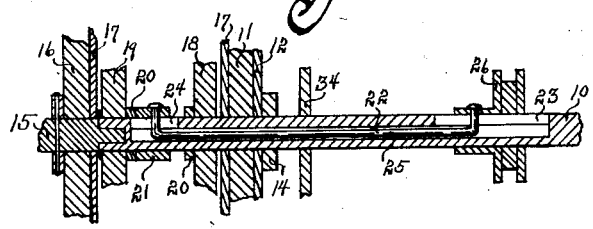
Fig. 2 is a side sectional view of a part of my transmission and more fully illustrates its interior construction.

I have used the numeral 10 to designate the shaft designed to be in operative engagement with the clutch and power plant of the vehicle. Loosely and rotatably mounted near the rear end of this shaft is the large bevel gear 11 having the inner clutch plate 12 permanently secured on its rear side. On the face of this clutch plate are radial and spaced apart grooves 13. This gear and clutch plate are limited to sliding movement on the shaft 10 to one direction by the collar 14 rigidly secured on the shaft 10. The numeral 15 designates a second shaft having a reduced end entering a well in the rear end of the shaft 10. By this construction the shafts 10 and 15 may rotate independently of the other. Near the end of the shaft 15 and adjacent the rear end of the shaft 10 is the large bevel gear 16 rigidly secured on the shaft 15. This bevel gear is a duplicate of the gear 11. Rotatably mounted on the shafts 15 and 10 and between the gears 11 and 16 is a cage 17. Loosely and rotatably mounted on the shaft 10, inside the cage 17 and spaced apart are the two small bevel gears 18 and 19, respectively. These two bevel gears face each other and each have secured on their opposite centers facing each other, a toothed collar 20. Slidably mounted on the shaft 10, between the two bevel gears 18 and 19 and capable of engaging either of the toothed collars is the sleeve 21 having teeth on each of its marginal ends corresponding with the teeth on the toothed collars. The numeral 22 designates a bore in the shaft 10, and the numerals 23 and 24, longitudinal slots in the shaft 10 communicating with the bore as shown in Fig. 2. The numeral 25 designates a control rod in the bore 22 having one end extending up through the slot 24 and secured to the sleeve 21, and its other end extending up through the slot 23 and secured to the wheel 26. I have used the numeral 27 to designate a hand lever having a forked end to engage the peripheral groove on the wheel 26. By this arrangement the sleeve 21 will be incapable of independent rotation relative to the shaft 10 and by operating the lever 27 the sleeve may be moved to engage either of the toothed collars, or to a neutral position out of engagement with either of them. I have used the numeral 28 to designate a shaft rotatably mounted in one end of the cage 17. Secured on the inner end of this shaft is a small bevel gear in engagement with the bevel gears 18 and 19 and which I have designated by the numeral 29. Secured on the outer end of the shaft 28 is a large bevel gear 30 in engagement with the two large bevel gears 11 and 16. In the other end of the cage is rotatably mounted a shaft 31. Secured on the inner end of this shaft is a small bevel gear 32 in engagement with the two small bevel gears 18 and 19 as shown in Fig. 1. Secured on the outer end of the shaft 31 is a large bevel gear 33 in engagement with the two large bevel gears 11 and 16.

Figure 3:
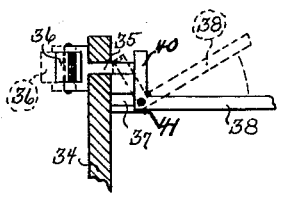
Fig. 3 is a side sectional view of a portion of the outer clutch plate and illustrates the manner in which the two clutches are operatively connected one to the other by centrifugal force.
Figure 4:
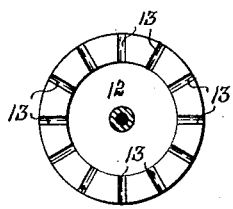
Fig. 4 is a front view of the inner clutch plate.

Rigidly secured on the shaft 10 and spaced apart from the clutch plate 12 is the outer clutch plate 34. Slidably mounted in the plate 34, spaced apart and extending toward the plate 12 are a plurality of square bars 35 each carrying a roller 36 on its inner end as shown in Fig. 3. On the outer face of the plate 34 and adjacent each bar 35 is a U-shaped bracket 37. The numeral 38 designates an arm pivoted at an end to each of the brackets and having a weight 39 on its other end. Integrally formed on each of the arms 38 and extending transversely thereof is a projection 40 capable of engaging the bar 35 adjacent to it, as shown in my drawings. By this arrangement the arms 38 may swing outwardly and force the rollers 36 inwardly, as shown in Fig. 3, into the grooves 13. The numeral 41 designates a stop on each bracket to limit the inward movement of the arms beyond a horizontal plane.

The operation of my invention may be controlled by the hand lever 27, which when pushed forwardly, will cause the sleeve 21 to be in a position in engagement with the bevel gear 19. As soon as the shaft 10 starts rotating there will be a contacting of the two clutch plates which will act as a drag on the large bevel gear 11. This drag will tend to hold the large bevel gears 30 and 33, which are secured to the cage 17, from their independent circling on the bevel gears 11 and 16.

As the weights 39 move outwardly the two clutch plates will lock with each other and prevent the bevel gears 30 and 33 from any independent circling of the bevel gears 11 and 16 and all of the gears will be locked for forward speed, as the shaft 10 will be rigidly secured to the shaft 15. By placing the lever 27 in "neutral" position the sleeve 21 will not be in engagement with either of the bevel gears 18 or 19 and the transmission will not be in operation.

Although I have described my invention in use with automotive vehicles, it may be used to equal advantage on other machinery whenever a transmission of this type is desired.

Some changes may be made in the construction and arrangement of my improved combination transmission without departing from the real spirit and purpose of my invention, and it is my intention to cover by my claims any modified forms of structure or use of mechanical equivalents which may be reasonably included within their scope.

I claim:

1. In a device of the class described, a drive shaft designed to be in operative communication with a prime mover, a second drive shaft, a toothed gear loosely mounted on said first mentioned shaft, a second toothed gear rigidly secured to said second shaft, a third toothed gear on said first mentioned shaft and smaller in size than said before mentioned toothed gears, a means for rigidly securing said last mentioned toothed gear to said first mentioned shaft, a fourth toothed gear engaging the first and second toothed gears, a fifth toothed gear operatively connected to the fourth toothed gear and engaging the third mentioned toothed gear and of approximately the same size as the said third toothed gear, a plate rigidly secured to the first mentioned shaft and adjacent the first mentioned toothed gear, and a means for operatively connecting said plate with said first mentioned toothed gear after said first mentioned shaft has reached a predetermined speed rotation thereby preventing independent rotation between said plate and said first mentioned toothed gear.

2. In a device of the class described, a drive shaft designed to be in operative communication with a prime mover, a second drive shaft, a bevel gear loosely mounted on said first mentioned shaft, a second bevel gear rigidly secured to said second shaft, a third bevel gear on said first mentioned shaft and smaller in size than said before mentioned bevel gears, a means for rigidly securing said last mentioned bevel gear to said first mentioned shaft, a fourth bevel gear engaging the first and second bevel gears, a fifth bevel gear operatively connected to the fourth bevel gear and engaging the third mentioned bevel gear and of approximately the same size as the said third bevel gear, a plate rigidly secured to the first mentioned shaft and adjacent the first mentioned bevel gear, and a means for operatively connecting said plate with said first mentioned bevel gear after said first mentioned shaft has reached a predetermined speed rotation thereby preventing independent rotation between said plate and said first mentioned bevel gear.

3. In a device of the class described, a drive shaft designed to be in operative communication with a prime mover, a second drive shaft, a bevel gear loosely mounted on said first mentioned shaft, a second bevel gear rigidly secured to said second shaft, a third bevel gear on said first mentioned shaft and smaller in size than said before mentioned bevel gears, a means for rigidly securing said last mentioned bevel gear to said first mentioned shaft, a fourth bevel gear engaging the first and second bevel gears, a fifth bevel gear operatively connected to the fourth bevel gear and engaging the third mentioned bevel gear and of approximately the same size as the said third bevel gear, a plate rigidly secured to the first mentioned shaft and adjacent the first mentioned bevel gear, and a means for automatically operatively connecting said plate with said first mentioned bevel gear after said first mentioned shaft has reached a predetermined speed rotation thereby preventing independent rotation between said plate and said first mentioned bevel gear.

4. In a device of the class described, a shaft, a second shaft, a bevel gear loosely mounted on first mentioned shaft, a second bevel gear rigidly secured to said second mentioned shaft and of the same size as said first mentioned bevel gear, a cage member between said bevel gears and rotatably mounted on said first and second shafts, a shaft rotatably mounted in one end of said cage, a second shaft rotatably mounted in the other end of said cage, a bevel gear rigidly secured on the outer end of each of said shafts rotatably mounted in said cage each engaging both said first and second mentioned bevel gears, a relatively small bevel gear rigidly secured on the inner end of each of said shafts rotatably mounted in said cage, a bevel gear of approximately the same size as said last mentioned two bevel gears; engaging the same and loosely mounted on said first mentioned shaft, a manually operated means for securing said last mentioned bevel gear to said first mentioned shaft, a plate rigidly secured on said first mentioned shaft and adjacent the bevel gear thereon, and a means for automatically operatively connecting said plate to said last mentioned bevel gear against independent rotation one to the other when said first mentioned shaft attains a certain speed rotation.

5. In a device of the class described, a shaft, a second shaft, a bevel gear loosely mounted on first mentioned shaft, a second bevel gear rigidly secured to said second mentioned shaft and of the same size as said first mentioned bevel gear, a cage member between said bevel gears and rotatably mounted on said first and second shafts, a shaft rotatably mounted in one end of said cage, a second shaft rotatably mounted in the other end of said cage, a bevel gear rigidly secured on the outer end of each of said shafts rotatably mounted in said cage each engaging both said first and second mentioned bevel gears, a relatively small bevel gear rigidly secured on the inner end of each of said shafts rotatably mounted in said cage, a small bevel gear loosely mounted on said first mentioned shaft and engaging the relatively small bevel gears, a second small bevel gear loosely mounted on said first mentioned shaft; facing said first mentioned small gear and engaging said relatively small bevel gears, a manual means for selectively operatively connecting said first mentioned shaft with either of said small bevel gears, a plate rigidly secured on said first mentioned shaft and adjacent the bevel gear thereon, and a means for automatically operatively connecting said plate to said last mentioned bevel gear against independent rotation one to the other when said first mentioned shaft attains a certain speed rotation.

6. In a device of the class described, a shaft, a second shaft, a bevel gear loosely mounted on first mentioned shaft, a second bevel gear rigidly secured to said second mentioned shaft and of the same size as said first mentioned bevel gear, a cage member between said bevel gears and rotatably mounted on said first and second shafts, a shaft rotatably mounted in one end of said cage, a second shaft rotatably mounted in the other end of said cage, a bevel gear rigidly secured on the outer end of each of said shafts rotatably mounted in said cage each engaging both said first and second mentioned bevel gears, a relatively small bevel gear rigidly secured on the inner end of each of said shafts rotatably mounted in said cage, a small bevel gear loosely mounted on said first mentioned shaft and engaging the relatively small bevel gears, a second small bevel gear loosely mounted on said first mentioned shaft; facing said first mentioned small gear and engaging said relatively small bevel gears, a manual means for selectively operatively connecting said first mentioned shaft with either of said small bevel gears, a plate secured on the back of said first mentioned bevel gear, a second plate rigidly secured to said first mentioned shaft and adjacent said first mentioned clutch plate, members slidably mounted on said second plate capable of engaging said first mentioned plate, and arms pivotally secured to said second mentioned plate so designed and arranged that when said second plate attains a certain speed rotation they will be moved outwardly by centrifugal force and force said slidably mounted members in engagement with said clutch plate.

7. In a device of the class described, a shaft, a second shaft, a bevel gear loosely mounted on first mentioned shaft, a second bevel gear rigidly secured to said second mentioned shaft and of the same size as said first mentioned bevel gear, a cage member between said bevel gears and rotatably mounted on said first and second shafts, a shaft rotatably mounted in one end of said cage, a second shaft rotatably mounted in the other end of said cage, a bevel gear rigidly secured on the outer end of each of said shafts rotatably mounted in said cage each engaging both said first and second mentioned bevel gears, a relatively small bevel gear rigidly secured on the inner end of each of said shafts rotatably mounted in said cage, a small bevel gear loosely mounted on said first mentioned shaft and engaging the relatively small bevel gears, a second small bevel gear loosely mounted on said first mentioned shaft; facing said first mentioned small gear and engaging said relatively small bevel gears, a manual means for selectively operatively connecting said first mentioned shaft with either of said small bevel gears, a clutch plate rigidly secured to said first mentioned bevel gear, grooves on the face of said clutch plate, a second plate rigidly secured on said first mentioned shaft, members slidably mounted in said second plate capable of being moved into engagement with said grooves, arms pivotally secured to said second plate capable of engaging said slidably mounted members, and weights on the outer end of each of said arms;

said arms being so arranged and positioned that when said second plate attains a predetermined speed rotation said arms will be moved outwardly by centrifugal force and force said slidably mounted members into said grooves.

THEODORE F. THOMPSON.